US007259896B2

(12) United States Patent
Hsu et al.

(10) Patent No.: US 7,259,896 B2
(45) Date of Patent: Aug. 21, 2007

(54) OFFICE AUTOMATION APPARATUS WITH CALIBRATION AND POSITIONING DEVICE FOR AUTOMATIC DOCUMENT FEEDER

(75) Inventors: Hsueh Chou Hsu, Kao Hsiung (TW); Chi-Chien Lin, Hsin Chu Hsien (TW)

(73) Assignee: Lite-on Technology Corporation, Taipei (TW)

( * ) Notice: Subject to any disclaimer, the term of this patent is extended or adjusted under 35 U.S.C. 154(b) by 1132 days.

(21) Appl. No.: 10/265,245

(22) Filed: Oct. 7, 2002

(65) Prior Publication Data

US 2004/0067083 A1 Apr. 8, 2004

(51) Int. Cl.
*H04N 1/04* (2006.01)

(52) U.S. Cl. ...................... 358/498; 358/474; 358/496; 358/497; 358/406; 358/505; 358/506; 399/367

(58) Field of Classification Search ................ 358/504, 358/406, 496, 498, 474, 486, 488, 461; 399/367, 399/371, 374, 380, 207; 355/23, 24; 382/312, 382/318, 319
See application file for complete search history.

(56) References Cited

U.S. PATENT DOCUMENTS

| | | | | |
|---|---|---|---|---|
| 6,606,464 | B2 * | 8/2003 | Asakawa | 399/51 |
| 6,771,397 | B2 * | 8/2004 | Hashizume | 358/474 |
| 6,891,647 | B2 * | 5/2005 | Konno | 358/497 |
| 6,900,448 | B1 * | 5/2005 | Thompson | 250/559.1 |
| 6,947,187 | B2 * | 9/2005 | Mui et al. | 358/496 |
| 2005/0225803 | A1 * | 10/2005 | Enomoto | 358/1.18 |
| 2006/0001919 | A1 * | 1/2006 | Owens et al. | 358/498 |
| 2006/0250661 | A1 * | 11/2006 | Susaki | 358/461 |

* cited by examiner

*Primary Examiner*—Cheukfan Lee

(74) *Attorney, Agent, or Firm*—Birch, Stewart, Kolasch & Birch, LLP

(57) ABSTRACT

An office automation apparatus with calibration and positioning device includes a body with an optical module, an automatic document feeder (ADF) arranged at the body and a home pattern having both positioning and calibrating functions and placed below the automatic document feeder and having a first marking for color calibration of the office automation apparatus and a second marking for positioning the optical module to a home location. The home pattern can provide both calibration and positioning functions for saving space and cost.

5 Claims, 5 Drawing Sheets

OFFICE AUTOMATION APPARATUS WITH CALIBRATION AND POSITIONING DEVICE FOR AUTOMATIC DOCUMENT FEEDER

FIELD OF THE INVENTION

The present invention relates to an office automation apparatus, especially to an office automation apparatus with a device providing both calibration and positioning functions to save space and cost.

BACKGROUND OF THE INVENTION

The current development trends for office automation apparatus are compact size and more integration in functions, while the cost thereof is also desired to reduce.

The office automation apparatus can be classified to single-function office automation apparatus such as stand-alone printer, copier and scanner; and multiple-function office automation apparatus such as a multiple purpose printer (MFP) integrated with copying, printing, scanning and facsimile functions.

Moreover, the current office automation apparatus is also incorporated with automatic document feeder (ADF) to save effort of user. However, the office automation apparatus with ADF generally requires operations for positioning optical module (such as CCD or CIS) and calibrating color before scanning (including the scanning process for copying). A positioning sensor is required and cost is increased.

FIGS. 1 and 2 show a conventional office automation apparatus with a flatbed body 1, an optical module 13 in the flatbed body 1, an automatic document feeder (ADF) 2 arranged at a left top side of the flatbed body 1, and a top housing 11 arranged at remaining top portion of the flatbed body 1 and used to retain a scanning/copying glass 12. A calibration plate 121 is provided between a left side of the scanning/copying glass 12 and the top housing 11. A document to be scanned is moved by a gear set 23 in the ADF 2 and then fed into the office automation apparatus. Moreover, the document is guided by a guiding groove 21 to move through a scanning window 22 below which the optical module 13 is arranged. Therefore, the document is scanned by the optical module 13 while being fed to pass through the scanning window 22. Moreover, a home sensor 131 is provided at a left side of the optical module 13 to position the optical module 13 to a home location.

However, before scanning operation, the optical module 13 is subjected to a calibration step wherein the optical module 13 is moved rightward to a position below the calibiation plate 121 for the calibration step. Afterward, the optical module 13 is returned to the home location under the control of the home sensor 131. The calibration step is cumbersome and additional hardware (the home sensor 131) is required.

Therefore, it is desired to calibrate the optical module 13 and move back the optical module 13 to the home location with better efficiency.

SUMMARY OF THE INVENTION

It is the object of the present invention to provide an office automation apparatus with calibration and positioning device to solve problems met in the conventional office automation apparatus such as the considerable rightward movement of the optical module, the provision of the home sensor, the waste of space due to the arrangement position.

To achieve above object, the present invention provides an office automation apparatus with calibration and positioning device for automatic document feeder, which comprises a body with an optical module, an automatic document feeder (ADF) arranged at the body and a home pattern having both positioning and calibrating functions and placed below the automatic document feeder and having a first marking for color calibration of the office automation apparatus and a second marking for positioning the optical module to a home location. The home pattern can provide both calibration and positioning function for saving space and cost.

The various objects and advantages of the present invention will be more readily understood from the following detailed description when read in conjunction with the appended drawing, in which:

DETAILED DESCRIPTION OF THE INVENTION

Figure 3:
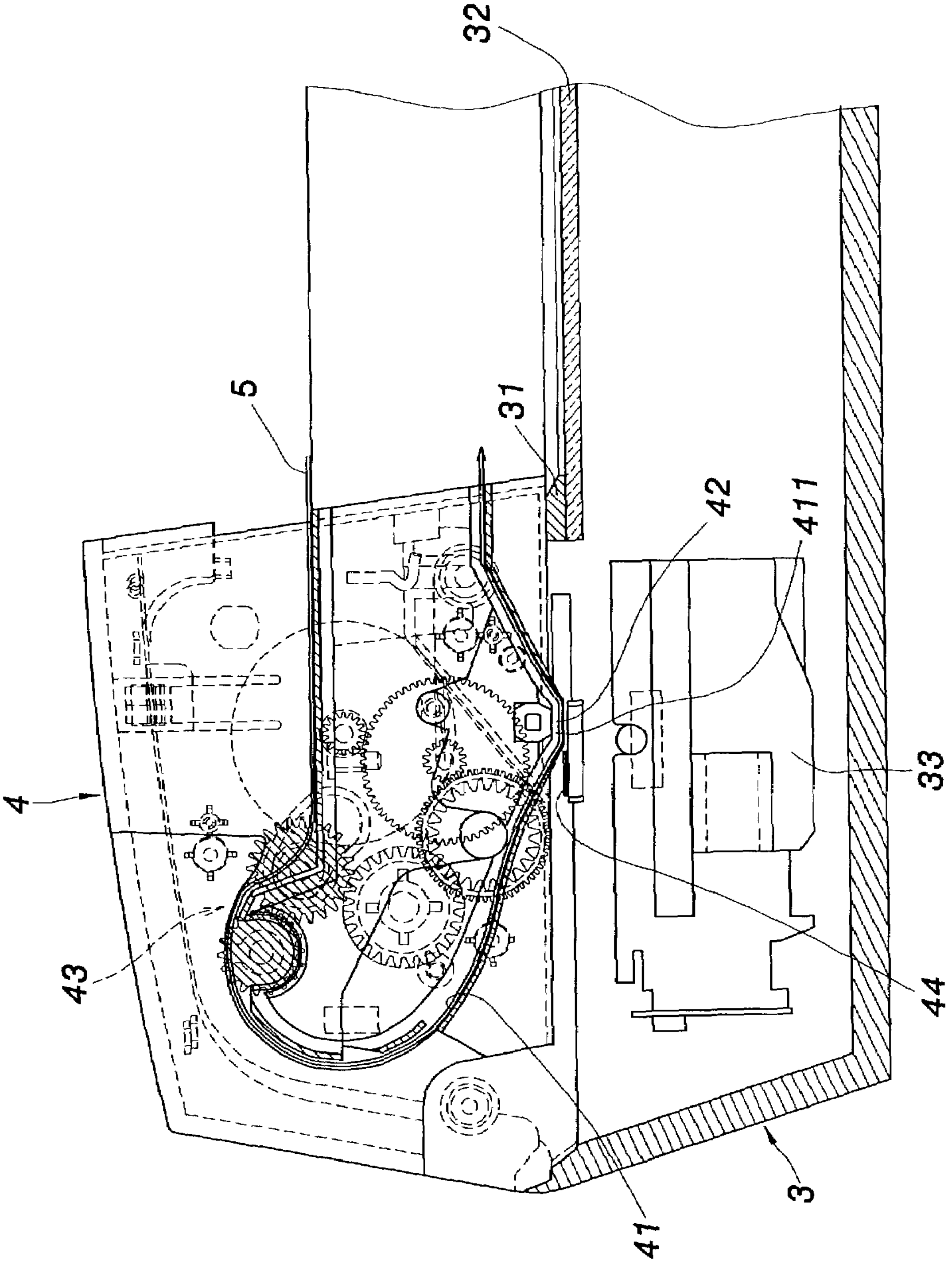
FIG. 3 shows a sectional view of office automation apparatus according to a first preferred embodiment of the present invention.
Figure 4:
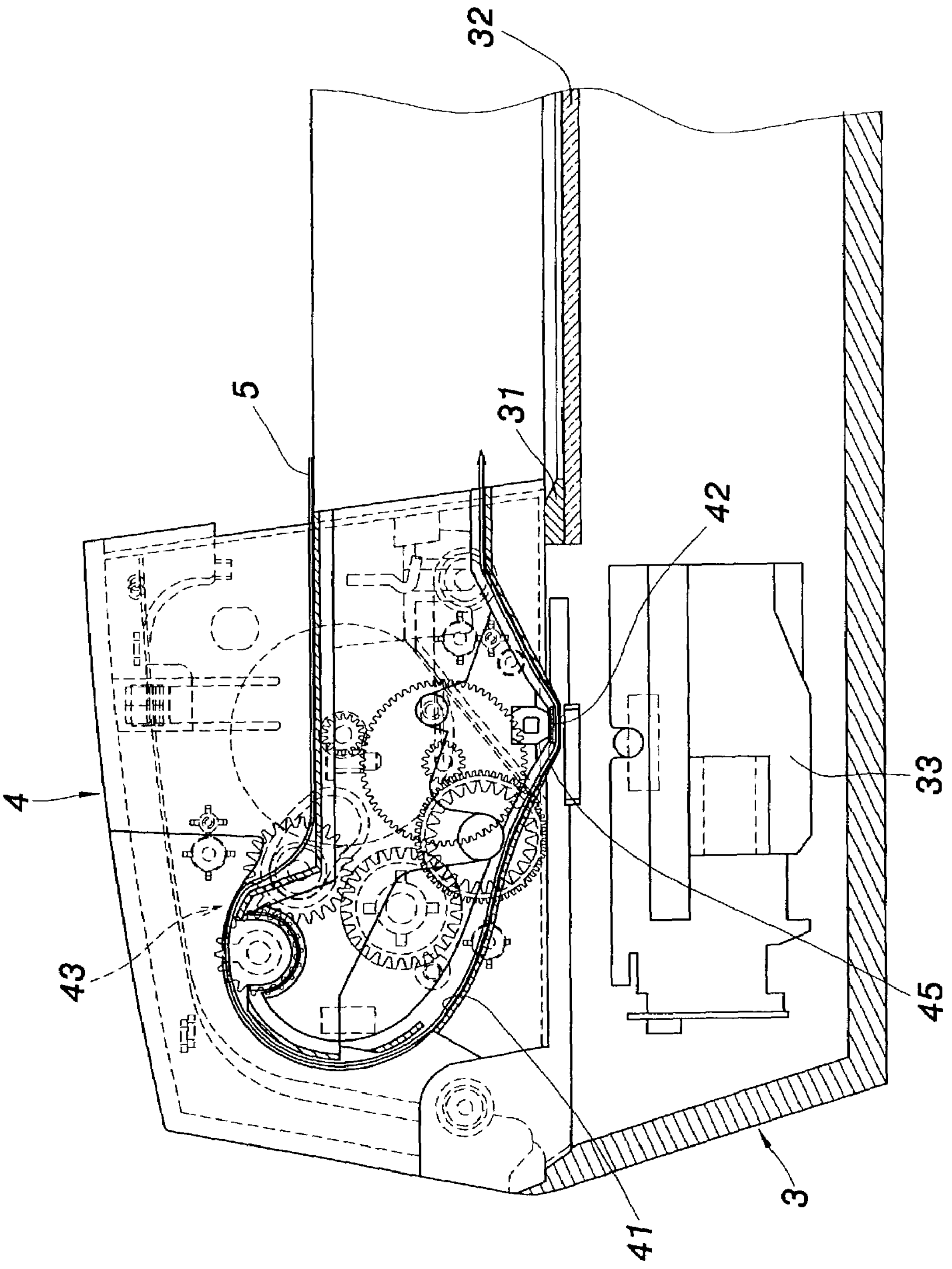
FIG. 4 shows a sectional view of office automation apparatus according to a second preferred embodiment of the present invention.

With reference now to FIGS. 3 and 4, the present invention provides an office automation apparatus with positioning and calibrating device for automatic document feeder (ADF). In the two preferred embodiments of the present invention described in detail below, the office automation apparatus comprises a flatbed body 3, an optical module 33 in the flatbed body 3, an automatic document feeder (ADF) 4 arranged at a left top side of the flatbed body 3, and a top housing 31 arranged at remaining top portion of the flatbed body 3 and used to retain a scanning/copying glass 32. A document to be scanned is moved by a gear set 43 in the ADF 4 and then fed into the office automation apparatus. Moreover, the document is guided by a guiding groove 41 to move through a scanning window 42 below which the optical module 33 is arranged. Therefore, the document is scanner by the optical module 33 while being fed to pass through the scanning window 42. The document is moved along a traveling path 5 as shown in FIGS. 3 and 4.

FIRST PREFERRED EMBODIMENT

Figure 5:
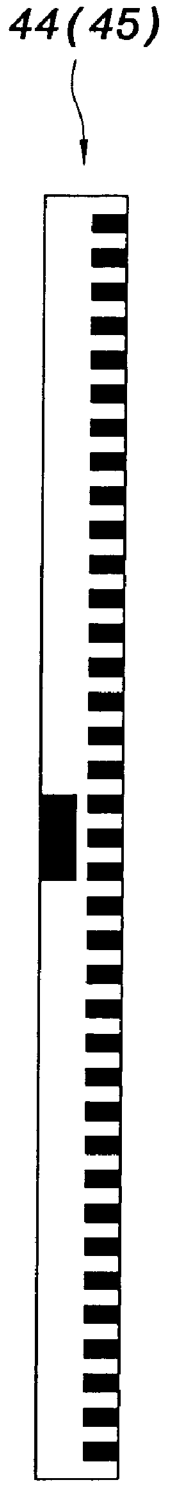
FIG. 5 shows a top view of the home pattern in the present invention.

FIG. 3 shows the first preferred embodiment of the present invention, wherein a home pattern 44 with both positioning and calibrating functions is placed below the ADF 4 and outside a left end of the scanning window 42. FIG. 5 shows the figure of the home pattern 44, which comprises a first pattern section with stripy markings at right side thereof for color calibration of the office automation apparatus and a second pattern section with a single marking at left side thereof for positioning the optical module 33 to the home location.

To initialize the office automation apparatus with ADF, the optical module 33 is slightly moved leftward to a position below the home pattern 44. The home pattern 44 can perform both calibration and positioning functions for the optical module 33. Therefore, both time and space can be saved. After the calibration and positioning operation, the optical module 33 is returned to the home location by a home information provided by the home pattern 44. After the optical module 33 is returned to the home location, the document to be scanned can be moved to pass the scanning window 42 and scanned by the optical module 33 at rest.

Moreover, the guiding groove 41 has a gap 411 under the scanning window 42 through the document to be scanned is passed.

SECOND PREFERRED EMBODIMENT

FIG. 4 shows the second preferred embodiment of the present invention. The second preferred embodiment is similar to the first preferred embodiment except that the position of the home pattern 45. The home pattern 45 of the second preferred embodiment is arranged at the scanning window 42 and in the gap 411 below the guiding groove 41. The document to be scanned passes underneath the home pattern 45 such that the document to be scanned will not be blocked by the home pattern 45. When the document is fed into the ADF 4 and the head end thereof does not reach the home pattern 45, the optical module 33 is moved to a position below the home pattern 45 for color calibration and acquiring positioning. Afterward, the optical module 33 is returned to a home location according to a positioning information provided by the home pattern 45 and the document is driven to pass through the scanning window 42 and scanned by the optical module 33 at rest.

Figure 1:
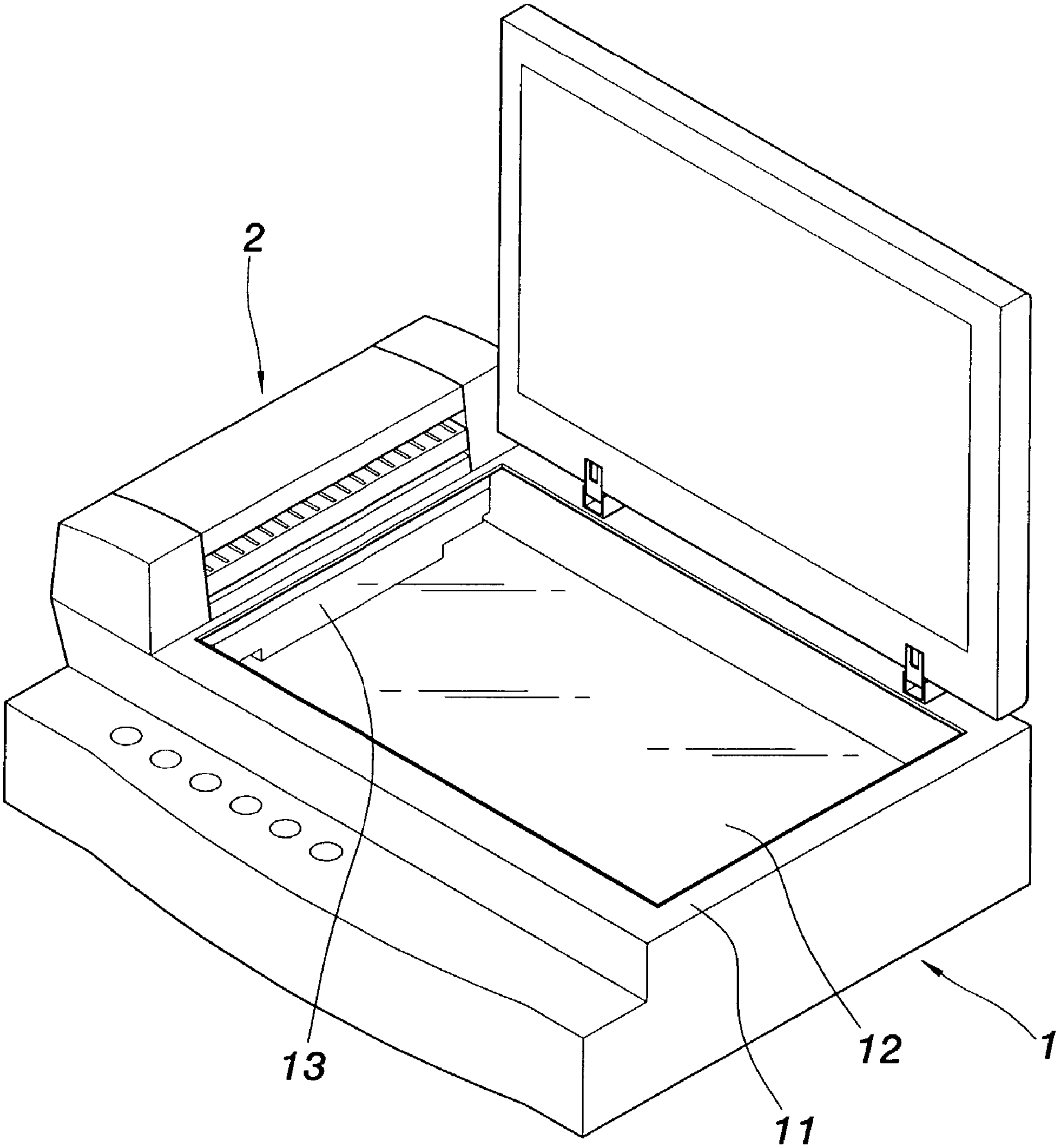
FIG. 1 PRIOR ART
FIG. 1 shows a perspective view of conventional office automation apparatus with opening cover.
Figure 2:
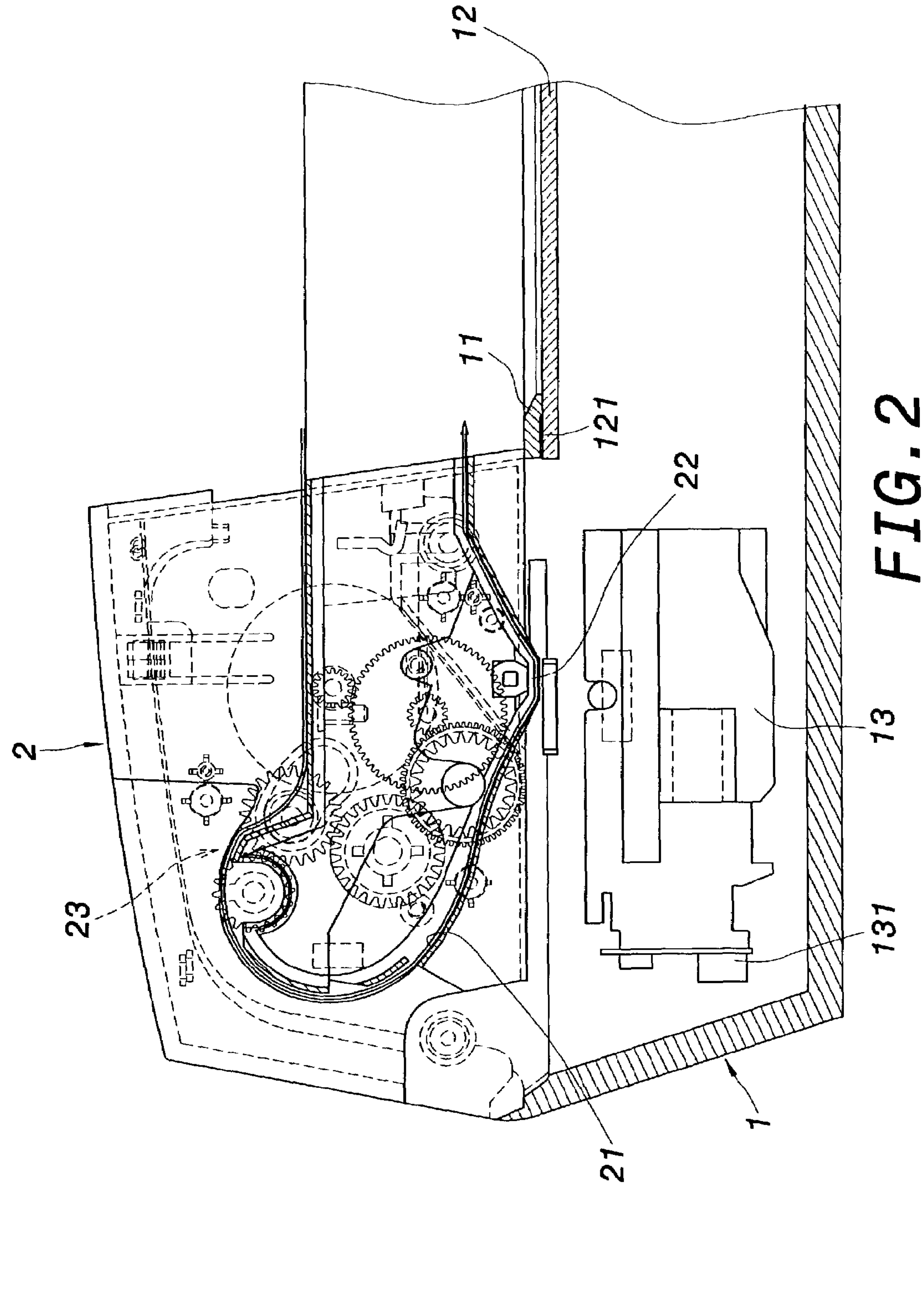
FIG. 2 PRIOR ART
FIG. 2 shows a sectional view of conventional office automation apparatus with closed cover.

Both the first preferred embodiment and the second preferred embodiment have the first advantage of saving the home sensor in conventional office automation apparatus as shown in numeral 131 of FIG. 2. Both the first preferred embodiment and the second preferred embodiment have the second advantage of providing more economic arrangement position for the home pattern. In the conventional office automation apparatus, the arrangement position of the calibration plate is between a left side of the scanning/copying glass 12 and the top housing 11. In the present invention, the arrangement position of the home pattern is placed at a bottom position of the ADF 4 for saving place.

The first preferred embodiment further has third advantage wherein the home pattern 44 with calibration and positioning function is located below the ADF 4 and outside a left end of the scanning window 42. Therefore, the optical module 33 requires only a slight leftward movement for calibration and positioning instead of a considerable rightward movement for calibration and positioning as in convention office automation apparatus. The time for initialization is reduced. The second preferred embodiment further has third advantage wherein the home pattern 45 with calibration and positioning function is located on the scanning window 42. Therefore, the optical module 33 does not require a considerable rightward movement for calibration and positioning as in convention office automation apparatus.

In the present invention, the home pattern 44 (45) can provide both calibration and positioning function, the home sensor can be saved to reduce cost. Moreover, the home pattern 44 (45) is arranged below the ADF 4 (either outside a left end of the scanning window 42 or on the scanning window 42). Therefore, the considerable rightward movement of the optical module 33 for calibration and positioning as in conventional office automation apparatus is not required.

To sum up, the office automation apparatus with calibration and positioning device according to the present invention can solve problems met in the conventional office automation apparatus such as the considerable rightward movement of the optical module, the provision of the home sensor, the waste of space due to the arrangement position.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. An office automation apparatus with calibration and positioning device for automatic document feeder, comprising a body with an optical module;

an automatic document feeder (ADF) arranged at the body, and having a home pattern with both positioning and calibrating functions placed below the automatic document feeder and having a first pattern section for color calibration of the office automation apparatus and a second pattern section for positioning the optical module to a home location.

2. The office automation apparatus as in claim 1, wherein the automatic document feeder has a guiding groove and a scanning window formed at a lower end of the guiding groove.

3. The office automation apparatus as in claim 2, wherein the home pattern is placed outside a left end of the scanning window.

4. The office automation apparatus as in claim 2, wherein the guiding groove has a gap corresponding to the scanning window.

5. The office automation apparatus as in claim 4, wherein the home pattern is arranged on the scanning window and within the gap, and a document to be scanned passes below the home pattern.

* * * * *